Figure 1:
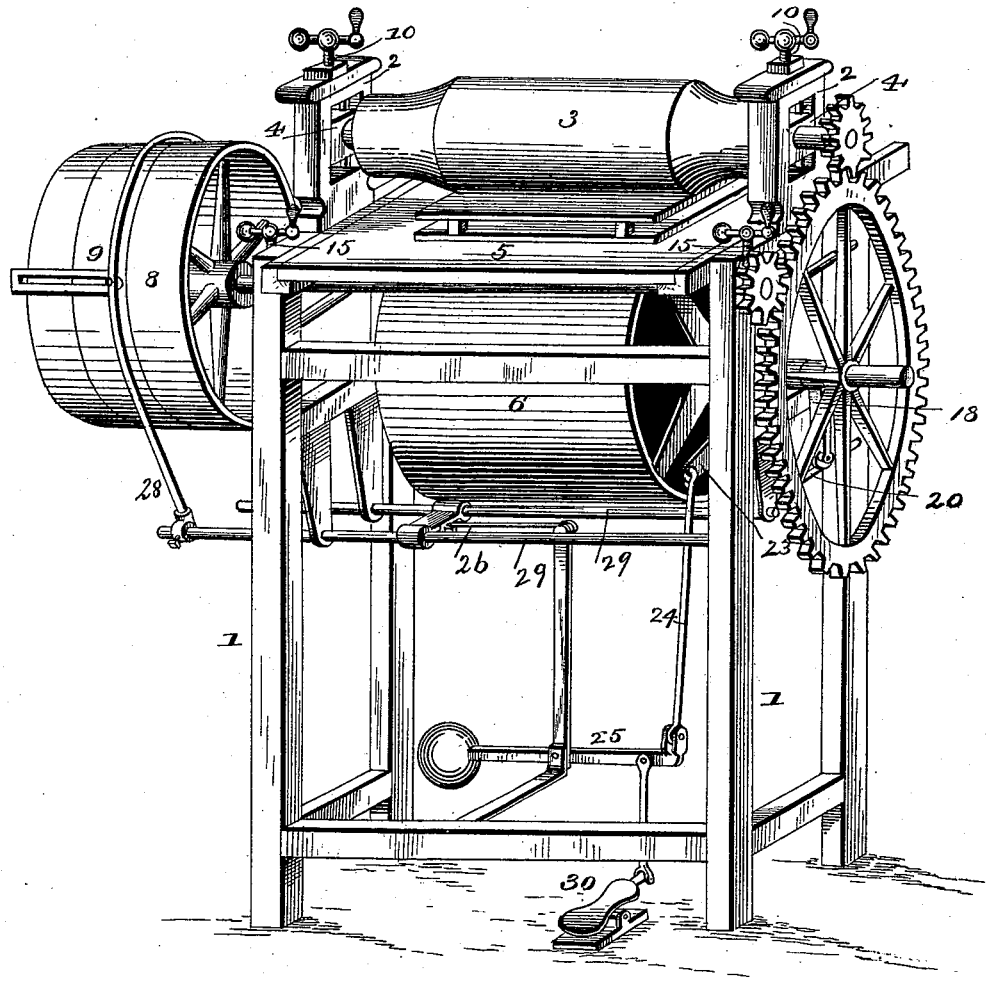

(No Model.) 2 Sheets—Sheet 1.

J. J. DALEY.
REVERSING MECHANISM FOR IRONING MACHINES.

No. 415,094. Patented Nov. 12, 1889.

WITNESSES
F. L. Durand.
C. F. Chisholm.

INVENTOR
John J. Daley,
By Louis Bagger & Co.
Attorneys.

(No Model.) 2 Sheets—Sheet 2.
J. J. DALEY.
REVERSING MECHANISM FOR IRONING MACHINES.
No. 415,094. Patented Nov. 12, 1889.
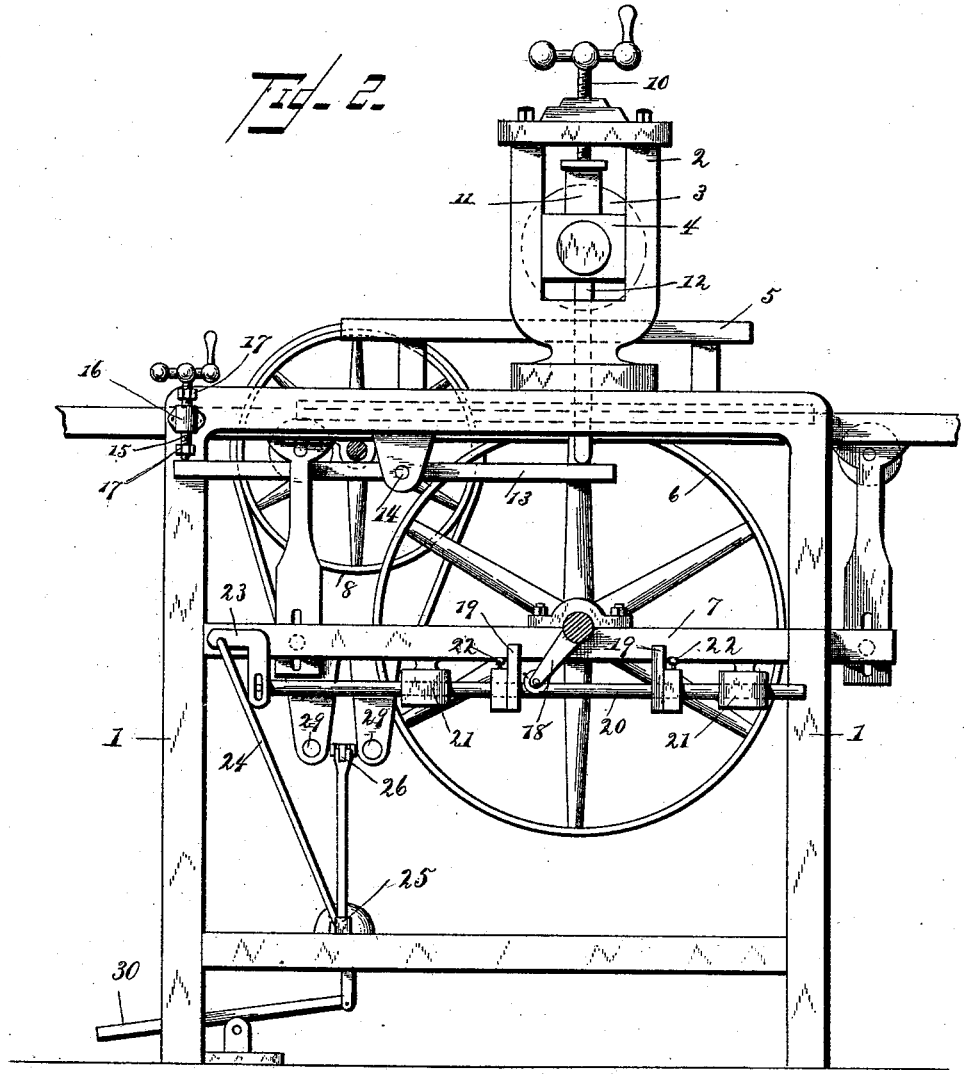
WITNESSES
P. L. Ouregud.
C. F. Chisholm.
INVENTOR
John J. Daley,
by Louis Bagger & Co.
Attorneys

UNITED STATES PATENT OFFICE.

JOHN J. DALEY, OF BROOKLYN, NEW YORK.

REVERSING MECHANISM FOR IRONING-MACHINES.

SPECIFICATION forming part of Letters Patent No. 415,094, dated November 12, 1889.

Application filed May 4, 1889. Serial No. 309,646. (No model.)

*To all whom it may concern:*

Be it known that I, JOHN J. DALEY, a citizen of the United States, and a resident of Brooklyn, in the county of Kings and State of New York, have invented certain new and useful Improvements in Reversing Mechanism for Ironing-Machines; and I do hereby declare that the following is a full, clear, and exact description of the invention, which will enable others skilled in the art to which it appertains to make and use the same.

My invention relates to improvements in reversing mechanism for ironing-machines, and has especial reference to mechanism for automatically reversing the travel of the ironing-table and for starting and stopping the machine, and the leading object of the invention is the provision of mechanism for the purpose stated, which comprises few parts, whereby the same is rendered simple and inexpensive of construction, and which mechanism will be thoroughly efficient for the purposes intended.

To attain the desired objects the invention consists of an improved mechanism operated automatically to shift the crossed belt to the tight pulley, which drives the large or lower roll in one direction, then the straight belt to the tight pulley, which operates the said roll in the opposite direction, whereby the ironing-table is moved back and forth automatically; further, of an improved mechanism operated by the foot to start and stop the machine when desired; further, of an improved mechanism for adjusting the travel or movement of the ironing-table to accommodate the same to various characters of work, and the invention consists, finally, in the novel construction, combination, arrangement, and adaptation of parts for service, substantially as shown, described, and specifically claimed.

Figure 1 represents a perspective view of an ironing-machine constructed in accordance with and embodying my invention. Fig. 2 represents a side elevation thereof.

Referring by numerals to the drawings, in which similar numerals denote corresponding parts in said figures, the numeral 1 designates the frame of the machine; 2, the slotted uprights or standards rising from the top of said frame; 3, the ironing or heated roll mounted in boxes 4, arranged in the slotted uprights; 5, the ironing-table; 6, the large or lower roll mounted in the frame 7; 8, the loose pulleys, and 9 the fast pulley for revolving the roll in opposite or reversed directions.

Passing through the tops of the slotted uprights are handled screws 10, the lower ends whereof rest upon the spring-actuated caps 11, which exert their pressure on the upper faces of the boxes of the ironing-roll, and passing through the frame and lower portions of the slotted uprights are pins or rods 12, which bear at their upper ends against the lower faces of the said boxes of the ironing-roll. The lower ends of the pins or rods 12 rest upon one end of levers 13, which are fulcrumed at 14 to the frame and have their other ends in contact with adjusting-screws 15, working in boxes 16, secured to the frame, and on said screws are stops or check-nuts 17, to limit the vertical movement of the screws. The purpose of this construction is to regulate the pressure of the ironing-roll on the fabric or to elevate it above the same, the springs and screws which engage the same serving to press the roll smoothly and evenly on the fabric and allow the proper movement of the roll to prevent burning the fabric. In order to elevate the roll, it is merely necessary to elevate the pins or rods by depressing the lever by means of the screws which causes the pins to move upward and lift the boxes, and consequently the roller journaled therein. The stop-nuts on the screws insure the proper movement of the screws for causing the parts to bring the roller to the proper position. On the shaft of the large or lower roll is an arm 18, adapted to contact with adjustable projections or lugs 19 on a shaft or rod 20, mounted in boxes 21, secured to the frame, the projections being adjustable by means of set-screws 22, which hold them fast on the rod 20. From this construction it will be seen that the arm contacts with the projections and moves the shaft in reverse directions. One end of the rod 20 is connected loosely to an angle-arm 23, and the other end of said angle-arm is loosely connected to the upper end of a vertical rod 24, the lower end of which is connected to one end of a weighted T-lever 25, which is fulcrumed to the frame, and loosely connected to the upper end of the central vertical limb of the T-lever is an arm 26, which is connected to the rods 29, sliding in the frame and carrying the shifting device 28. To one end of the T-lever is connected a foot-treadle 30, the purpose of which is to start and stop the machine.

From the foregoing it will be understood that by depressing the foot-treadle the sliding rods are moved, which move the shifting device and throw the belt from one of the loose pulleys to the fast pulley, thus operating the large or lower roll and heating-roll and moving the ironing-table, or, in other words, starting the machine. When the machine has been started, the arm carried by the large or lower roll-shaft is caused to contact with one of the lugs on the rod, which moves the sliding rod, and, through the medium of the mechanism connected therewith, the shifting device, thus shifting the belt moving in one direction to the tight pulley. Now, when the arm contacts with the other lug the same action is repeated and the mechanism operated in the reverse direction to cause the band to be shifted to revolve the pulley in the reverse direction, causing the ironing-table to automatically move back and forth, the arm of the large or lower roll-shaft contacting first with one lug and then the other, which, through the medium of the mechanism described, operates the shifting mechanism in opposite directions and attains the end mentioned. When it is desired to stop the machine, the treadle is set level, causing both belts to shift onto the two loose pulleys, thus stopping the machine. The movement of the ironing-table may be varied by adjusting the lugs on the rod to cause the arm to strike them often or seldom, as desired, as will be readily understood.

I claim—

1. The combination of the shaft carrying the arm, the rod carrying the lugs adapted to be struck by said arm, the angle-arm connected to said rod, the rod connected to the angle-arm, the lever connected to said arm, and the shifting device connected to and operated by the said lever, substantially in the manner and for the purpose described.

2. The combination of the roll-shaft carrying the arm, the adjustable lugs adapted to be struck by said arm, the sliding rod operated by said lugs, the arm connected to said rod, the lever operated by said arm, the shifting device operated by the lever, and the foot-treadle connected to the lever, all arranged and adapted to operate substantially as and for the purpose described.

In testimony that I claim the foregoing as my own I have hereunto affixed my signature in presence of two witnesses.

JOHN J. DALEY.

Witnesses:
　GEORGE J. DALEY,
　JOSEPH H. DALEY.